Patented Dec. 19, 1939

2,183,851

UNITED STATES PATENT OFFICE 2,183,851

PROCESS OF PREPARING COMPOUNDS OF THE CYCLOPENTANOPERHYDROPHENANTHRENE SERIES

Max Bockmühl, Gustav Ehrhart, Heinrich Ruschig, and Walter Aumüller, Frankfort-on-the-Main-Hochst, Germany, assignors to Winthrop Chemical Company, Inc., New York, N. Y., a corporation of New York No Drawing. Application November 26, 1938, Serial No. 242,606. In Germany December 2, 1937

9 Claims. (Cl. 260—397)

The present invention relates to a process of preparing compounds of the cyclopentanopolyhydrophenanthrene series.

The reduction of ketones and the oxidation of alcohols with the aid of aluminium alcoholates in the presence of substances accepting or yielding hydrogen has repeatedly been described (cf. Meerwein & Schmidt "Annalen der Chemie" 444/221, 1925; Ponndorf "Zeitschrift für angewandte Chemie" 39/138, 1926; German Patent No. 535,954). In "Recueil des Traveaux Chimiques des Pays Bas", 56, 1, 137, 1937, Oppenauer describes a process by which it is possible to oxidise for instance cholesterol by means of acetone in the presence of aluminiumisobutylate so as to obtain cholestenone. All these processes are limited to the use of pure ketones or alcohols.

Now we have found that it is possible to prepare ketones of the cyclopentanopolyhydrophenanthrene series by treating a compound of the cyclopentanopolyhydrophenanthrene series which at the carbon atom in 17-position has a side chain containing a basic nitrogenous group and which in 3-position has a hydroxyl group, with an aluminium-alcoholate in the presence of a ketone. The action of the aluminiumalcoholate causes in this case a dehydrogenation of the hydroxyl group being in 3-position, i. e. the formation of an oxo-group in this position, the ketone present serving as a hydrogen-acceptor. As hydrogen-acceptors there may, for instance be used acetone, methylethylketone, cyclohexanone, tetralone or quinone. As suitable alcoholates of aluminium there may, for instance, be employed the tertiary aluminiumbutyrate or aluminiumisopropylate. It is thus possible to transform the 3-hydroxyternorcholenylamine into the 3-oxo-ternorcholenylamine or the 3-hydroxyandrostenmethylketimine into the progesterone. The course of this reaction is surprising insofar as the basic group as such remains unaltered and does not react in any way with, for instance, the ketones formed. This leads to an essential simplification of the synthesis of the sexual hormones.

The following examples serve to illustrate the invention, but they are not intended to limit it thereto:

1. 2 grams of 3-hydroxyternorcholenylamine and 7.6 grams of tertiary aluminium butylate are boiled for 11 hours in a reflux apparatus in 100 cc. of benzene (anhydrous) with 45 cc. of acetone (anhydrous). The solution is then poured into water, caustic soda solution is added to the colloidal mixture until the aluminium hydroxide precipitated dissolves and the whole is extracted with ether. From the dry ethereal solution the 3-oxo-ternorcholenylamine may be precipitated in the form of the sulphate by means of sulphuric acid in ether. It forms pure, white flakes; in the open air, however, it is apt to become oily. The yield amounts to 1.95 grams.

2. A mixture of 1.6 grams of 3-hydroxyandrostenmethylketimine, 7.5 grams of tertiary aluminium butylate, 100 cc. of benzene and 45 cc. of acetone is boiled for 11 hours in a reflux apparatus. In order to hydrolize the ketimine group in the oxidation product the solution is then shaken for 24 hours with 200 cc. of N/2 sulfuric acid and the benzene solution is separated, dried and evaporated under reduced pressure. By crystallizing the organic residue from ether and aqueous alcohol the progesterone of melting point 118–129° C. is obtained.

We claim:

1. In the process of preparing compounds of the cyclopentanoperhydrophenanthrene series the step which comprises causing an aluminium-alcoholate in the presence of a ketone to act upon a compound of the cyclopentanopolyhydrophenanthrene series being substituted in 3-position by the hydroxyl group and in 17-position by a basic group.

2. In the process of preparing compounds of the cyclopentanoperhydrophenanthrene series the step which comprises causing tertiary aluminiumbutylate in the presence of a ketone to act upon a compound of the cyclopentanopolyhydrophenanthrene series being substituted in 3-position by the hydroxyl group and in 17-position by a basic group.

3. In the process of preparing compounds of the cyclopentanoperhydrophenanthrene series the step which comprises causing tertiary aluminiumbutylate in the presence of acetone to act upon a compound of the cyclopentanopolyhydrophenanthrene series being substituted in 3-position by the hydroxyl group and in 17-position by a basic group.

4. In the process of preparing compounds of the cyclopentanoperhydrophenanthrene series the step which comprises causing an aluminium-alcoholate in the presence of a ketone to act upon 3-hydroxyternorcholenylamine.

5. In the process of preparing compounds of the cyclopentanoperhydrophenanthrene series the step which comprises causing tertiary aluminiumbutylate in the presence of a ketone to act upon 3-hydroxyternorcholenylamine.

6. In the process of preparing compounds of the cyclopentanoperhydrophenanthrene series the step which comprises causing tertiary aluminiumbutylate in the presence of acetone to act upon 3-hydroxyternorcholenylamine.

7. In the process of preparing compounds of the cyclopentanoperhydrophenanthrene series the step which comprises causing an aluminium-alcoholate in the presence of a ketone to act upon 3-hydroxyandrostenmethylketimine.

8. In the process of preparing compounds of the cyclopentanoperhydrophenanthrene series the step which comprises causing tertiary aluminiumbutylate in the presence of a ketone to act upon 3-hydroxyandrostenmethylketimine.

9. In the process of preparing compounds of the cyclopentanoperhydrophenanthrene series the step which comprises causing tertiary aluminiumbutylate in the presence of acetone to act upon 3-hydroxyandrostenmethylketimine.

MAX BOCKMÜHL.
GUSTAV EHRHART.
HEINRICH RUSCHIG.
WALTER AUMÜLLER.